(12) United States Patent
Bonss et al.

(10) Patent No.: US 6,444,947 B1
(45) Date of Patent: Sep. 3, 2002

(54) METHOD AND DEVICE FOR LASER BEAM WELDING

(75) Inventors: Steffen Bonss, Zella-Mehlis; Jens Standfuss, Pirna; Eckhard Beyer, Weissig, all of (DE)

(73) Assignee: Fraunhofer-Gesellschaft zur Forderung der angewandten Forschung e.V. (DE)

( * ) Notice: Subject to any disclaimer, the term of this patent is extended or adjusted under 35 U.S.C. 154(b) by 0 days.

(21) Appl. No.: 09/463,737
(22) PCT Filed: Jul. 22, 1998
(86) PCT No.: PCT/EP98/04586
§ 371 (c)(1), (2), (4) Date: Feb. 16, 2000
(87) PCT Pub. No.: WO99/06173
PCT Pub. Date: Feb. 11, 1999

(30) Foreign Application Priority Data

Aug. 1, 1997 (DE) .......................... 197 33 371
Nov. 19, 1997 (DE) .......................... 197 51 195

(51) Int. Cl.⁷ ............................................ B23K 26/00
(52) U.S. Cl. ........................ 219/121.63; 219/121.64; 219/121.69; 219/121.76; 219/121; 219/83
(58) Field of Search ...................... 219/121.63, 121.64, 219/121.69, 121.76, 121.83

(56) References Cited

U.S. PATENT DOCUMENTS 5,821,493 A * 10/1998 Beyer et al. ........... 219/127.46
5,859,402 A * 1/1999 Maier .................... 219/121.64
5,869,805 A * 2/1999 Beyer et al. ........... 219/121.83

FOREIGN PATENT DOCUMENTS

JP 60240395 * 11/1985 ........... B23K/26/00

* cited by examiner

Primary Examiner—M. Alexandra Elve
(74) Attorney, Agent, or Firm—Leydig, Voit & Mayer, Ltd.

(57) ABSTRACT

The invention relates to a method and a device for laser-beam welding, because the invention is especially suitable for deep welding a wide variety of materials. The object of the invention is to weld a wide variety of materials by means of laser radiation, especially by deep welding, with a reduced amount of work and at the same time good quality of the welded joint produced. The procedure adopted for this according to the invention is that the intensity of the laser radiation is set by beam-shaping in and on the surface of workpieces in such a way that a small area in the workpiece is irradiated with a great intensity, to form a steam capillary there, and a further, larger adjacent area on the workpiece surface is irradiated with a lesser intensity, and as a result a bell-shaped opening of the steam capillary is formed on the workpiece surface and the cooling rate of the melted material is reduced.

20 Claims, 4 Drawing Sheets

METHOD AND DEVICE FOR LASER BEAM WELDING

The invention relates to a method and a device for laser-beam welding which is especially suitable for deep welding a wide variety of materials.

U.S. Pat. No. 4,914,268 discloses a welding method in which at least two different electron or laser beams are directed onto a workpiece to be welded, it being intended in particular for large-format parts to be connected to one another. According to the teaching described there, the two or three different beams are intended to perform different tasks. For instance, a first beam is provided for producing the actual welded joint and then a second beam is to be used to smooth the weld formed on the surface and a third beam is to perform a recrystallization to reverse at least partially the change in microstructure induced by the heat input, in order to avoid undesired states of stress in the area of the weld.

The relatively highly concentrated energy input that is required especially during deep welding gives rise to problems in that there is formed in the intensely heated-up area, extending relatively far into the workpiece, a steam capillary in which the plasma produced by the heating, and consequently also gaseous components, are under increased pressure and are prevented from escaping from the actual workpiece by a relatively small opening for the steam capillary being formed on account of the high energy input into the workpiece in relation to the energy input on the workpiece surface, possibly leading to problems in the interior of the workpiece and to uncontrolled splashing out of the steam capillary.

A further disadvantage is represented by the stresses induced by the great temperature gradients which remain in the material even after welding, and in this case especially in the area of the weld. Owing to the stress gradient and in dependence on material-specific properties, the formation of weld imperfections, especially the formation of hot and/or cold cracks, may occur during solidifying or cooling down. To avoid such thermal stresses, it is customary to carry out an appropriate temperature treatment, in which the entire workpiece is warmed up under definite, material-specific temperature conditions and is cooled down again. However, for a preheating of the workpiece to be welded, likewise known for avoiding thermal stresses, this requires an increased amount of time, and in particular an increased amount of energy, which has adverse effects on effectiveness and costs.

It is therefore the object of the invention to specify a possible way in which a wide variety of materials can be welded, especially deep-welded, by means of laser radiation and at the same time a reduced amount of work can be achieved simultaneously with good quality of the welded joint produced.

This object preferably is achieved by the characterizing features of the present invention. Advantageous embodiments and further developments of the invention will be apparent from the description provided herein.

The solution according to the invention is then employed in such a way that, by suitable beam-shaping, two areas are simultaneously irradiated with different intensities by means of at least one laser beam, a small area being irradiated with a great intensity and the laser beam being shaped in such a way that the maximum beam intensity acts in the workpiece and not on its surface, and a larger area being irradiated with a lesser intensity on the workpiece surface. The irradiation with the great intensity has the effect of forming in the workpiece a steam capillary, the opening of which is widened in a bell-shaped manner in the workpiece surface by the second irradiation with lower intensity. The larger area, which is irradiated with the lesser intensity, also leads advantageously to the temperature gradients being reduced and the cooling rate of the melted material being reduced, so that the thermal stresses and their gradients in the welding area can be greatly reduced and it is possible to dispense with thermal pre- or post-treatment.

The bell-shaped opening of the steam capillary in the direction of the workpiece surface has the effect that gaseous components attempting to escape from this area can leave unhindered and no build-ups or splashes occur. This also avoids material separations in the area of the weld, which may otherwise occur due to gas bubbles entrapped in the solidifying melted material. The bell-shaped opening of the steam capillary and the resultant shape of the bath of melted material surrounding the capillary may lead to an avoidance of process instabilities during deep welding at high welding speeds (humping effect).

There are in principle two possible ways of carrying out the method according to the invention. One is for a laser beam of a laser-beam source to be split into two different partial beams. The two partial beams can then be shaped and widened differently and then impinge on the workpiece in superposed form.

A second possible way is to use at least two laser-beam sources, the respective laser beams of which are differently focused and act with different intensities on or in the workpiece. Laser-beam sources which already have different output powers may be used for this purpose, the laser-beam source that directs the laser beam for forming the steam capillary onto the workpiece also having the higher output power.

Examples of lasers which may be used for this purpose are a $CO_2$ laser or an NdYAG laser, the beam of which is focused by a beam-shaping unit in such a way that the maximum intensity is obtained in the workpiece. The second laser may be a high-power diode laser, which may have an output power of approximately 1 kW or above.

In the method according to the invention, it is possible to work advantageously in such a way that the position of the area that is impinged upon with the greater intensity can be varied in relation to the other area, that is irradiated with the lower intensity on a material-specific basis or during the actual welding. The steam capillary can thus be formed for example in an area arranged off-center, within the area that surrounds this area and is irradiated with the lower intensity, if the laser beam used for this purpose is correspondingly aligned.

It may also be favorable if the ratios between the surface areas of the two different areas can be set, for example by modified beam-shaping, for example taking into consideration the material to be welded. This may be especially advantageous if the different thermal conductivities of the respective materials of the workpieces to be welded are taken into consideration.

The intensity of the laser radiation may, however, also be changed by regulating or controlling the laser power. In this way, on the one hand, the changing may take place with the material to be welded taken into consideration and, on the other hand, there is the possibility of regulating the laser power during the welding process. Such regulation can favorably take place in conjunction with a temperature measurement, the temperature distribution favorably being measured at least in the melted area. The temperature measurement should take place contactlessly, it being possible to use a plurality of individual temperature sensors that are locationally separated from one another or a correspondingly designed array. However, the known method of thermovision may also be used for temperature measurement. The regulation of the intensity with which the workpiece is irradiated by the various laser beams or partial beams may advantageously be varied separately for each individual beam.

A further possible way of bringing influence to bear while the method according to the invention is being carried out is for the position and/or the alignment of the individual laser beams or the partial beams of a laser beam to be changed in relation to one another by moving the laser-beam sources or mirrors. For example, the laser beam or beams intended to irradiate the area of lower intensity is or are directed at an inclination onto the surface of the material and an area on the surface of the material deviating from a circular shape is irradiated, forming an elliptical surface area of which the longer longitudinal axis points in the direction of the weld. For certain arrangements, however, it may also be favorable to obtain a two-dimensional formation turned through 90° C. thereto, allowing a wider edge weld area to be warmed up.

The temperatures that can be achieved in the workpiece may, however, also be influenced by changing the respective focusings of the individual laser beams.

In an advantageous embodiment of an example of a device according to the invention in which two different laser-beam sources are used, with it being possible for one of the laser-beam sources to comprise customary $CO_2$ lasers or NdYAG lasers and for the second laser-beam source to comprise a high-power diode laser, the high-power diode laser may be integrated into the beam-shaping unit of the first laser-beam source, which leads to a reduction in the required overall size of the device.

A further possibility for a device to be used for the invention, with two laser-beam sources, is that the partial beams emerging from the individual emitters of a diode laser are coupled into optical fibers and can be directed via the optical fibers in a targeted and locationally distributed manner onto the surface of the workpiece. This leads to greater flexibility in the arrangement of the diode laser, since the diode lasers currently available have to be arranged at a very limited small distance from the workpiece and problems can occur as a result in the case of complicatedly structured workpieces.

For increasing the distance between the diode laser and the workpiece, the laser beam emerging from the diode laser may also be directed through a light guide of relatively large dimensions in comparison with conventional optical fibers, for example a cylindrical body provided with a reflective coating on the outside surface, via which the laser beam can then be directed over a greater distance and preferably via a further lens onto the workpiece surface.

Already existing laser-beam welding installations may also be retrofitted with the invention, in that in the simplest case a high-power diode laser is additionally adapted to such a laser-welding installation.

The invention is to be explained below by way of example.

Figure 1:
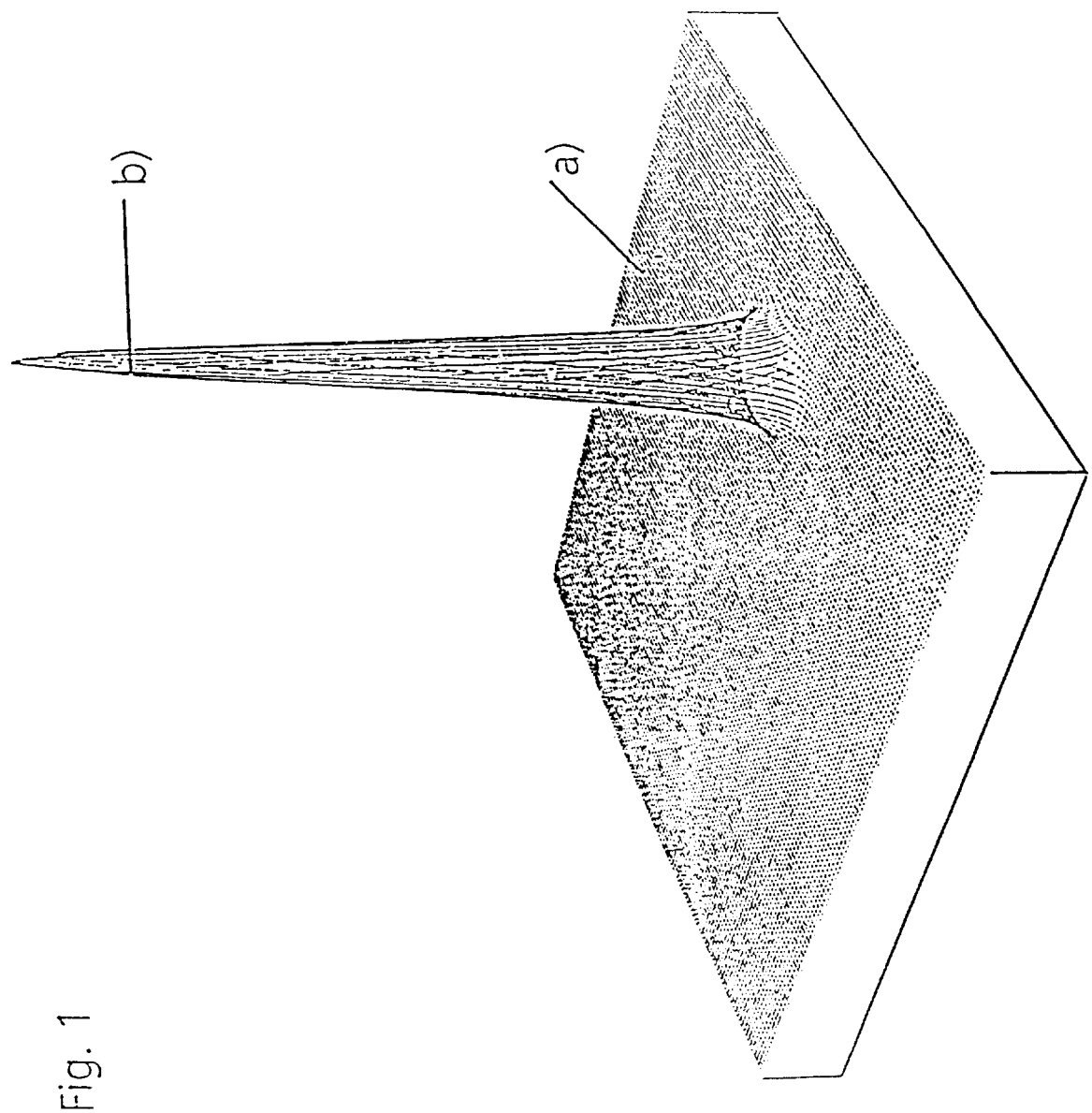
FIG. 1 shows the intensity distribution of the laser radiation that can be achieved with the invention.

In FIG. 1, the intensity distribution of the laser radiation, as can be achieved with the invention, is represented diagrammatically. It can be clearly seen that a small, highly concentrated area starting from the intensity plateau a has a vertical exaggeration b, with which the desired formation of the steam capillary in the workpiece can be achieved and improved deep welding becomes possible.

Figure 2:
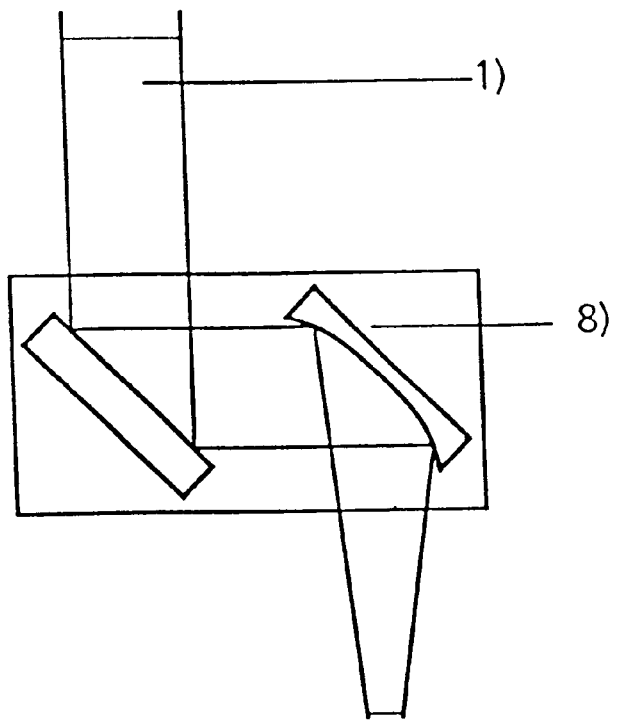
FIG. 2 shows the schematic construction that is used in the case of conventional laser-beam welding and two views of the workpiece area influenced thereby.
Figure 2:
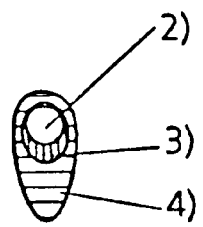
Figure 2:
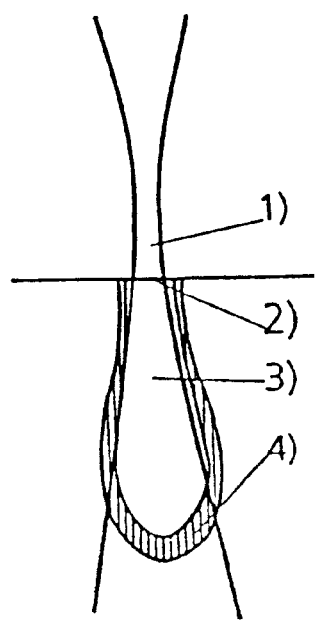

In FIG. 2, a conventional arrangement is reproduced in principle, the laser beam 1 of a single laser-beam source being directed via a laser-shaping unit 8 onto the surface of a workpiece. In the beam-shaping unit 8, a focusing of the laser beam 1 is achieved.

The representation that can be seen in the middle of FIG. 2 shows the range of influence of the laser beam 1 on the surface of the workpiece with the focus 2 of the laser beam 1, the steam capillary 3 and the egg-shaped/oval bath of melted material 4, which is formed around the focus 2 of the laser beam 1.

In the lower representation of FIG. 2, a section through the workpiece can then be seen. In this section, the steam capillary 3 formed has a constriction pointing in the direction of the surface of the workpiece and it can also be clearly seen that the steam capillary 3 is enclosed by the bath of melted material 4, even in the interior of the workpiece.

Figure 3:
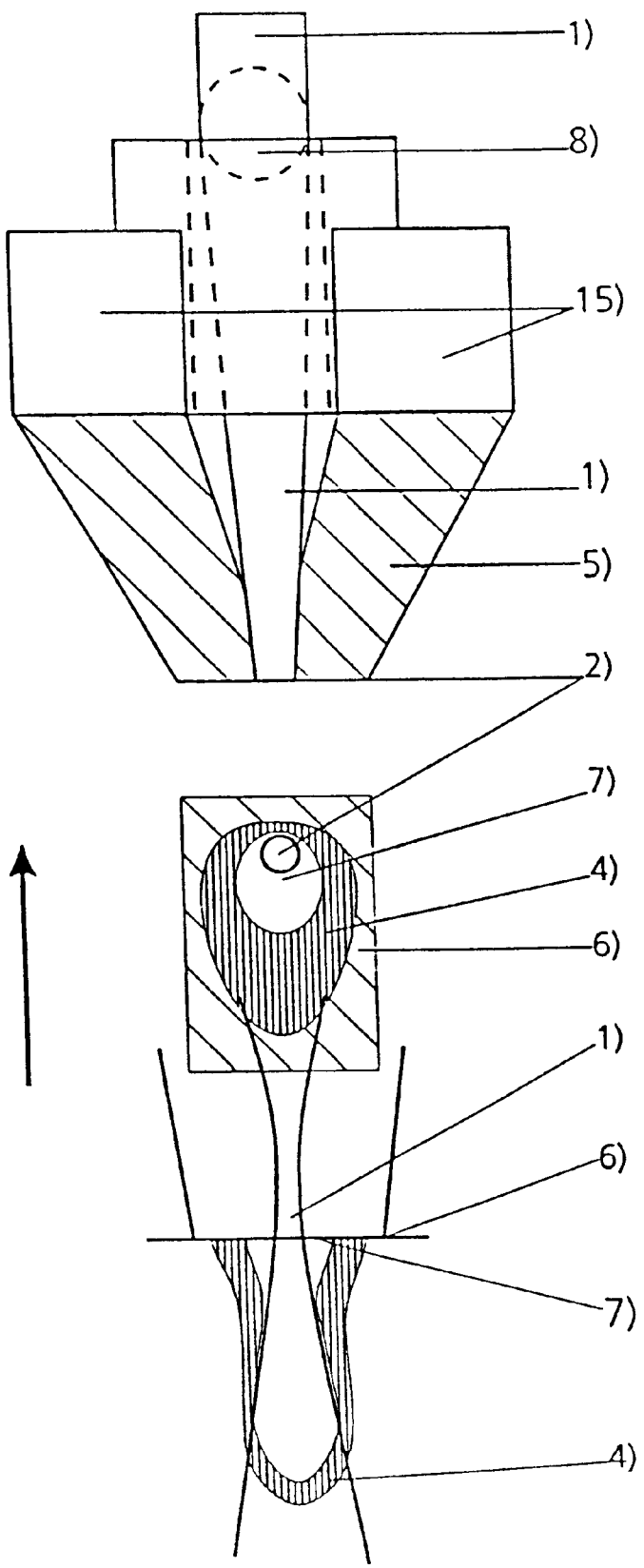
FIG. 3 shows the schematic structure of an example of a device according to the invention with two laser-beam sources and the corresponding views according to FIG. 2 that can be achieved with the changed radiation intensities.

In FIG. 3, an example of a device according to the invention is schematically shown in the upper representation.

In this case, a laser beam 1 of a conventional laser-beam source is also directed onto the surface of the workpiece via a beam-shaping unit 8, as can be used for example also in accordance with the prior art.

Arranged on or around the beam-shaping unit 8 is a high-power diode laser, the laser beams 5 of which are superposed on the laser beam 1 and with which a much larger two-dimensional area is irradiated on the surface of the workpiece.

In the middle representation, of FIG. 3, the irradiated area of the workpiece surface is again represented and both the focus 2 of the laser beam 1 and the focus 6 of the laser beam 5 can be seen. The focus 2 of the laser beam 1 is formed off-center from the focus 6 of the laser beam 5, it preferably being displaced in the direction of welding, corresponding to the arrow represented. In this representation, it can also be clearly seen that a much larger area 4 is melted and also the opening of the steam capillary 7 at the surface of the workpiece is much larger. This situation becomes clearer still in the lower representation of FIG. 3, the bell-like widening in the direction of the surface of the workpiece of the opening of the steam capillary 7 additionally being clear to see here.

The shape of the focus 6 of the laser beam 5 is obtained by a radiating direction of the laser beam 5 that is inclined with respect to the workpiece surface.

In the larger area of influence, counter to the direction of welding, the bath of melted material can be kept warmed up, at least in the area close to the surface, and the solidifying rate can be slowed as a result, by reducing the cooling rate.

Figure 4:
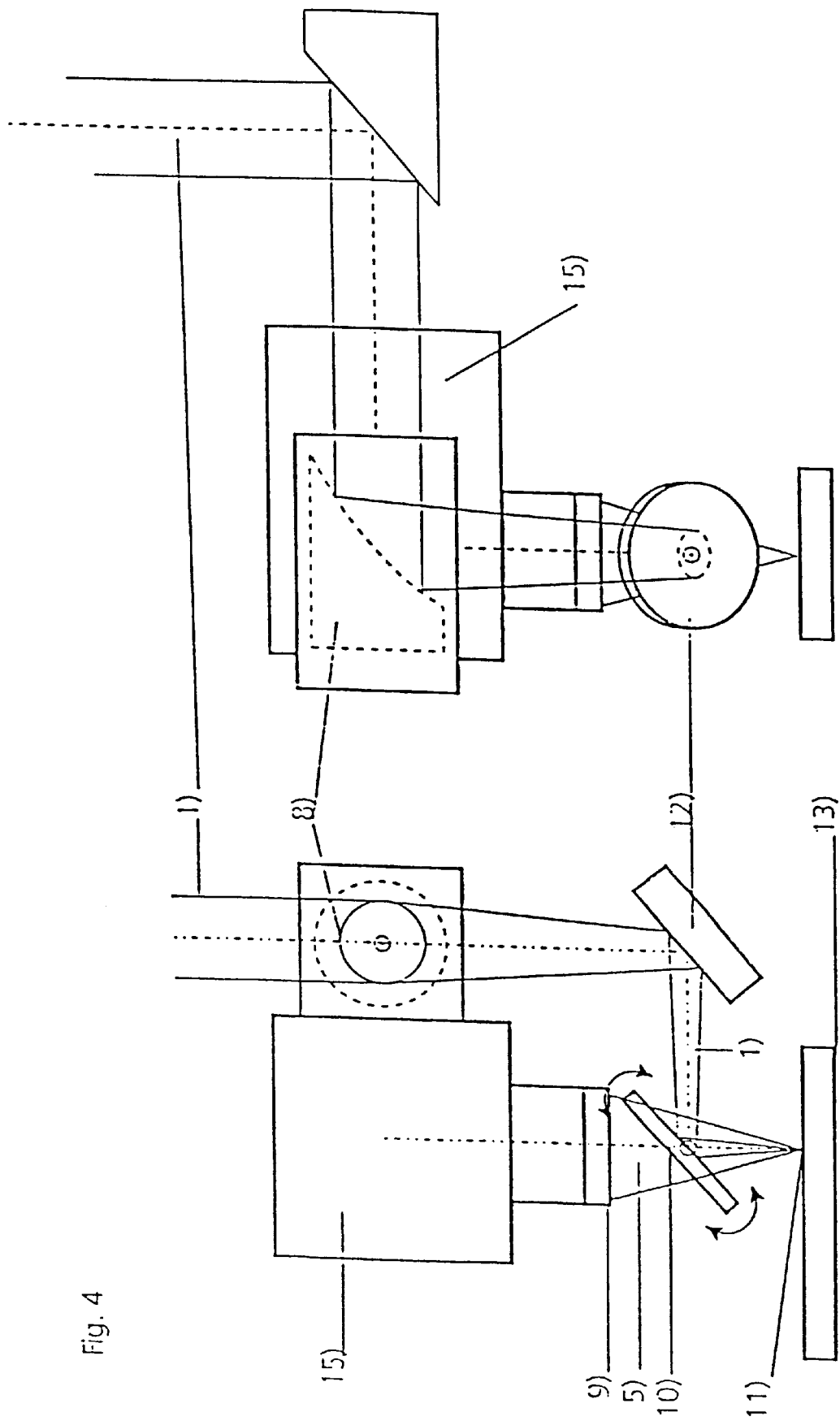
FIG. 4 shows an example of a device according to the invention in two views.

A further example of a device according to the invention is represented in FIG. 4. In this case, a conventional laser is used, the laser beam 1 of which is directed via an already mentioned beam-shaping unit 8 and two mirrors 10 and 12 onto the working location 11 of the workpiece 13.

In addition, a high-power diode laser 15 with corresponding optics 9 is used for beam-shaping, the laser beam 5 of which is superposed on the laser beam 1.

In FIG. 4, it is made clear by in each case two double-headed arrows that the mirror 10, which can be arranged directly in the path of rays of the laser beam 5 for the case in which it is reflective for the laser beam 1 and transmissive for the laser beam 5, can be turned at least about one axis. When the mirror 10 is swiveled, the impinging location of the laser beam 1 on the surface of the workpiece 13 and the size of the focus 2 can be changed.

If a mirror 10 that is opaque to the laser beam 5 is used, the laser beam 5 must be directed such that it is inclined at an angle onto the surface of the workpiece 13, while at the same time an angle which ensures that the laser beam 5 can impinge on the surface of the workpiece 13 unhindered by the mirror 10 must be maintained.

What is claimed is:

1. A method of laser-beam welding in which a steam capillary with a widened opening is formed in a workpiece using two laser beams or two partial beams of one laser beam, wherein the intensity of the laser radiation is increased by beam-shaping with maximum intensity in the workpiece for forming the steam capillary widened in a bell-shaped manner, and a further, larger adjacent area on the workpiece surface is irradiated with lesser laser intensity.

2. The method of claim 1, wherein a laser beam is split into two partial beams and one of the two partial beams is shaped such that it is widened and is superposed on the second partial beam, so that the widened and shaped partial beam irradiates the area with the lesser intensity.

3. The method of claim 1, wherein laser beams of at least two laser-beam sources are directed with different focusing and intensities onto the workpiece.

4. The method of claim 1, wherein the localization of the area with greater intensity and/or its surface area is changed in relation to the area with lesser intensity.

5. The method of claim 1, wherein the intensity of the laser radiation is varied.

6. The method of claim 5, wherein the intensity of the laser beam or partial beam for forming the steam capillary is varied.

7. The method of claim 1, wherein the position and/or alignment of the laser beams or partial beams in relation to one another is varied.

8. The method of claim 7, wherein the position and/or alignment is varied temperature-dependently.

9. The method of claim 1, wherein the intensity of the laser beams or partial beams is regulated temperature-dependently.

10. The method of claim 1, wherein the focusing of the laser beams or partial beams is varied.

11. The method of claim 1, wherein the laser power of the laser radiation is controlled or regulated material- and/or temperature-dependently.

12. A device for carrying out the method of claim 1, wherein a laser beam of a laser-beam source is directed onto a beam splitter and two partial beams are directed onto two beam-shaping units and a highly focused partial beam, which is superposed by the second, defocused partial beam, is directed by means of a beam-shaping unit onto the workpiece.

13. A device for carrying out the method of claim 1, wherein two laser beams of two laser-beam sources are directed with different intensity onto the workpiece.

14. The device of claim 13, wherein one laser-beam source is a $CO_2$ laser or an NdYAG laser and the second laser-beam source is a diode laser.

15. The device of claim 13, wherein the second laser-beam source is integrated into the beam-shaping unit of the first laser-beam source.

16. The device of claim 13, wherein partial beams emerging from the emitters of the diode laser are directed onto the workpiece via optical fibres.

17. The device of claim 13, wherein the laser beam is directed onto the workpiece via mirrors, one mirror being reflective for the laser beam and transmissive for the laser beam and arranged in the path of rays of the latter.

18. The device of claim 17, wherein the mirror can be turned about at least one axis.

19. The device of claim 12, wherein the temperature distribution on the workpiece can be measured with at least one temperature sensor.

20. The device of claim 12, wherein the temperature sensors is/are connected to a control system regulating the laser-beam sources and/or the beam-shaping units.

* * * * *